United States Patent
Mitani et al.

(10) Patent No.: US 6,828,016 B2
(45) Date of Patent: Dec. 7, 2004

(54) PREFORM FOR COMPOSITE MATERIAL AND COMPOSITE MATERIAL

(75) Inventors: Kazutami Mitani, Nagaya (JP); Kazuya Goto, Nagaya (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 0 days.

(21) Appl. No.: 10/742,898

(22) Filed: Dec. 23, 2003

(65) Prior Publication Data

US 2004/0137208 A1 Jul. 15, 2004

Related U.S. Application Data

(63) Continuation of application No. 09/926,282, filed as application No. PCT/JP00/02319 on Apr. 10, 2000, now abandoned.

(30) Foreign Application Priority Data

Apr. 8, 1999 (JP) ............................................ 11-101617

(51) Int. Cl.$^7$ ................................................. B32B 15/04
(52) U.S. Cl. .................... 428/340; 428/219; 428/304.4; 428/320.2; 428/323; 428/364; 428/394; 428/326; 428/367; 428/172; 428/190; 428/188; 428/201; 428/327; 428/339
(58) Field of Search ................................ 428/172, 188, 428/190, 201, 219, 340, 304.4, 323, 327, 320.2, 394, 364, 367, 339

(56) References Cited

U.S. PATENT DOCUMENTS

| 5,484,642 A | * | 1/1996 | Bompard et al. ............ 428/166 |
| 6,139,942 A | * | 10/2000 | Hartness et al. ......... 428/298.1 |

FOREIGN PATENT DOCUMENTS

| EP | 0 270 411 | 6/1988 |
| FR | 2 605 929 | 5/1988 |
| JP | 63-203844 | 8/1988 |
| JP | 5-38717 | 2/1993 |
| JP | 6-501654 | 2/1994 |
| WO | WO 92/06845 | 4/1992 |

* cited by examiner

*Primary Examiner*—Merrick Dixon
(74) *Attorney, Agent, or Firm*—Oblon, Spivak, McClelland, Maier & Neustadt, P.C.

(57) ABSTRACT

A preform can be molded by resin transfer molding and yields a composite material having excellent strength and excellent interlaminar debonding resistance. The preform, which is for producing a fiber-reinforced composite, comprises layers of laminated structure of a reinforcing material comprising reinforcement fibers and has, between these layers, a layer comprising a thermoplastic resin and having space so as not to inhibit a liquid resin from flowing therethrough. The preform is molded to yield a fiber-reinforced composite material.

20 Claims, No Drawings

PREFORM FOR COMPOSITE MATERIAL AND COMPOSITE MATERIAL

This application is a Continuation application of U.S. Ser. No. 09/926,282, filed on Oct. 5, 2001, now abandoned, which is a 371 of International Application PCT/JP00/02319 filed Apr. 10, 2000.

TECHNICAL FIELD

This invention relates to a preform for a composite material which is preferably used for resin transfer molding, and to a fiber-reinforced composite material formed by molding the preform.

BACKGROUND ART

As a preform material for resin transfer molding, conventionally, a random mat and a swirl mat are used. Furthermore, if high strength and elastic modulus are required, a laminated product formed of a long fiber fabric in which reinforcement fibers are arranged relatively in line and a material formed by stitching the laminated product so as to be engaged, are used. Recently, various preforms for manufacturing a braiding material having an involute shape, three-dimensional fabric, and the like, which have excellent properties, have been developed.

In a composite material which is reinforced by using a laminated product formed of reinforcement fiber fabric such as a plain-woven fabric, satin woven fabric, and the like, since interlaminar debonding caused by an impact or the like considerably depends on toughness of a matrix resin, it is not easy to give interlaminar debonding resistance at a high level to a composite material formed by molding thermosetting resin using resin transfer molding for a matrix resin, wherein it is difficult to improve the toughness of the resin.

A preform formed as a unit by stitching a laminated product by laminating fabric in the direction of thickness shows an effect of inhibiting the interlaminar debonding. However, on the other hand, a special sewing machine is required in order to stitch the three-dimensional laminated fabric, and there is a trade-off (inverse proportion) between improvement of the interlaminar debonding resistance by increasing stitch density in the direction of thickness and strength in the direction of the inside from surfaces of the laminated product.

In the braiding material and the three-dimensional fabric, reinforcement fiber can be arranged in the direction of thickness of the composite material, and therefore, a composite material having excellent properties can be obtained. However, if large structures are to be manufactured, a machine for manufacturing preforms corresponding to the structures must be huge and the cost per unit of preform will be enormous.

Furthermore, in a composite material obtained by laminating and hardening a sheet type intermediate material (prepreg) made of reinforcement fiber impregnated with thermosetting resin, it is known that thermoplastic resin is provided between layers of a laminated product by a method such that a film, particles, fiber, non-woven fabric, and the like formed of thermoplastic resin are provided on surfaces of prepregs or between prepregs during a step of laminating prepregs in order to improve a property of interlaminar debonding resistance. However, in resin transfer molding in which a preform is formed with reinforcement fiber and subsequently, matrix resin is injected, it is necessary to ensure sufficient flow of the matrix resin when the matrix resin is injected. Therefore, the above method for improving interlaminar debonding resistance which is applied for prepregs cannot simply be applied to the resin transfer molding.

DISCLOSURE OF INVENTION

An object of the present invention is to provide a preform for a composite material and a composite material formed from the preform, wherein the composite material can be molded by resin transfer molding, having excellent strength and a property of interlaminar debonding resistance.

As a result of diligent research with regard to the preform for a composite material providing a composite material having excellent strength and excellent interlaminar debonding resistance, the present inventors have found that the above object can be achieved by using a laminated product formed of reinforcement fiber in which a thermoplastic resin layer having a space so as not to inhibit liquid resin from flowing therethrough, is provided between layers of the laminated product. The laminated product is preferably used as a preform for resin transfer molding.

That is, the present invention provides a preform for a fiber-reinforced composite material comprising a reinforcing material formed of reinforcement fiber forming layers as a laminated structure and a thermoplastic resin layer having space so as not to inhibit liquid resin from flowing therethrough, provided between the layers.

Furthermore, the present invention provides a fiber-reinforced composite material formed by molding the above preform for a composite material.

BEST MODE FOR CARRYING OUT THE INVENTION

A reinforcing material made of reinforcement fiber used for a preform for a composite material is a fiber exhibiting excellent strength and/or elastic modulus such as carbon fiber, glass fiber, aramid fiber, and the like. In particular, carbon fiber is preferably used for excellent strength and elastic modulus.

The reinforcing material made of the above fiber is generally supplied as a fiber bundle (tow) composed of tens to tens of thousands of fibers. The fiber tows may be spread or be provided in the same direction to form a layer and the layers are put on each other so as to be laminated so that a fiber tow of the layer is provided in the different direction from another fiber tow to form a laminated structure. Furthermore, the reinforcing material may be formed into uniaxial, biaxial, or triaxial plane-woven fabric beforehand and at least one kind of the plane-woven fabrics is put on another to form a laminated structure. The uniaxial fabric is made by weaving fiber or fiber tows which are provided in a predetermined direction (longitudinal direction) on a planar surface and a low number of threads (weft) in lateral or oblique direction, or by bonding and engaging the fiber or fiber tows to a low number of threads in a lateral or oblique direction. The uniaxial fabric refers to a sheet composed of practically only fiber tows provided in the longitudinal direction.

A resin forming the thermoplastic resin layer which is provided between the layers composed of reinforcing material formed of the above reinforcement fiber, is not limited as long as the resin can be processed into porous films, fibers, reticulated structures, or knitted loops. The thermoplastic resins, which have excellent toughness, such as polyamides, polyether imides, polyether ether ketones, polyimides, and the like are preferably used, and furthermore, the resin is selected from the above thermoplastic resins depending on the environment for use required by the desired composite material or on a matrix resin used for the composite material.

The above thermoplastic resin layer provided between the layers composed of reinforcing material formed of the reinforcement fibers is required to provide space appropriately so as not to inhibit liquid resin from flowing therethrough. The phrase "so as not to inhibit liquid resin from flowing therethrough" means "the thermoplastic resin layer does not inhibit liquid matrix resin from flowing in the preform" when the liquid matrix resin is injected into the preform in order to mold a composite material by the resin transfer molding. The space may be provided suitably, unless resistance generated when fluid flows in the thermoplastic resin layer is remarkably greater than resistance generated when fluid flows through the reinforcing material formed of the reinforcement fiber. A form of the thermoplastic resin layer as described above is selected from the group consisting of porous film, fiber, network structure, knitted loop, oriented fibers formed between layers of the reinforcing material formed of the reinforcement fiber, an aggregation of short fibers, an aggregation of particles, and the like.

The amount of the resin for forming the above thermoplastic resin layer which is provided between the layers composed of reinforcing material formed of the reinforcement fiber, is preferably set within 1 g/m$^2$ to 50 g/m$^2$ based on areal density per thermoplastic resin layer. If the amount of the resin is less than 1 g/m$^2$, fracture toughness, which prevents interlaminar debonding, is not sufficiently exhibited, and if the amount of the resin is larger than 50 g/m$^2$, the width between the layers of the reinforcing material becomes thicker and stress transfer is insufficient when the resin is used in the composite material.

If the thermoplastic resin layer provided between the layers composed of reinforcing material formed of the reinforcement fiber is composed of fibers of the thermoplastic resin, although a monofilament of the fiber is not limited in denier, 1 to 50 deniers (d) are preferably used. If the monofilament is finer than 1 d, the monofilament tends to be carried along by the flow of the liquid matrix resin during resin transfer molding, and sometimes the monofilaments break and are unevenly distributed. If the monofilament is thicker than 50 d, the area of an interface between the thermoplastic resin in the fiber and the matrix resin becomes smaller, and therefore interlaminar debonding resistance is not easily given.

The thermoplastic resin fiber provided between the layers formed of reinforcing material composed of the reinforcement fiber can be provided as monofilaments and also as fiber bundles (tows). If the fiber tow of thermoplastic resin is used, the fiber tow is spread or is cut and homogenously dispersed to be evenly provided between the layers composed of the reinforcing material formed of the reinforcement fiber. Furthermore, a row of provided fiber tows or spread fiber tows with remaining space between the fiber tows or a fabric made of the fiber tows can be used by providing it between the layers formed of reinforcing material composed of the reinforcement fiber. For example, the fiber tows formed of the thermoplastic resin are provided with spaces between one another on a reinforcing uniaxial fabric perpendicularly to the reinforcing direction of the uniaxial fabric formed of the reinforcement fiber.

A row of provided fiber tows or spread fiber tows with remaining space between the fiber tows or a fabric made of the fiber tow can be used by providing them between the layers formed of reinforcing material composed of the reinforcement fiber, and a ratio of the surface of the reinforcing material layer formed of the reinforcement fiber covered with the fiber bundle formed of the thermoplastic resin, is preferably over 20% in any square 1 cm on a side on the surface of the reinforcing material layer formed of reinforcement fiber.

Providing the above thermoplastic resin layer between the layers formed of reinforcing material composed of the reinforcement fiber is possible by, but is not limited to, forming a reinforcing material layer composed of the reinforcement fiber or a thermoplastic layer on the surface of an alternating laminate of reinforcing material layers composed of the reinforcement fiber and thermoplastic resin layers which have already been formed in the same manner, alternately laminating the reinforcing material layer composed of the reinforcement fiber and the thermoplastic resin layer which have been prepared respectively, or laminating sheets composed of the reinforcement fiber and the thermoplastic resin layer wherein the sheet is prepared by forming a thermoplastic resin layer on at least one surface of a reinforcing material sheet composed of the reinforcement fiber. If fiber or tape formed of thermoplastic resin is used as a base material forming a thermoplastic resin layer, fabrics formed by weaving the reinforcement fiber and the fiber or the tape of thermoplastic resin as the weft and warp are laminated.

The preform for composite material having a laminated structure according to the present invention is characterized in that the preform provides a composite material having excellent interlaminar debonding property by being molded by resin transfer molding. Moreover, stitching can be applied through the thickness of the reinforcing material layers formed of the reinforcement fiber.

As a matrix resin of the composite material used for the present invention, a thermosetting resin such as unsaturated polyester resin, vinyl ester resin, epoxy resin, bismaleimide resin, isocyanate resin, and the like is used, and the thermosetting resin is not limited if it can be used for the resin transfer molding. In particular, according to the present invention, as long as a matrix resin having inferior toughness is used, a composite material having excellent interlaminar debonding property is obtained, and therefore, various matrix resins can be adopted for the resin transfer molding.

Furthermore, since the preform for composite material having laminated structure according to the present invention is molded using the resin transfer molding, a fiber-reinforced composite material having high strength and excellent interlaminar debonding property can be obtained.

EXAMPLES

The present invention will be explained with reference to examples and comparative examples as follows.

Evaluation items and measuring methods for the fiber-reinforced composite material obtained by examples and comparative examples are described below.

[Interlaminar Debonding Property]

4.9 kg of an iron weight whose tip had a radius of 7.94 mm and a hemispheric shape was dropped on a composite material which was molded into flat shape. The area of interlaminar debonding (damaged area) generated by the above dropping of the iron weight was determined by a transmission method using an ultrasonic damage scanner. The area was evaluated by comparing with an area of interlaminar debonding for the composite material prepared without interlaminar reinforcement by the thermoplastic layers (reference example). Impact tests by dropping the iron weight on the composite material were carried out under the following conditions.

Condition 1: The iron weight was dropped in free-fall from a height of 32 cm.

Condition 2: The iron weight was dropped in free-fall from a height of 64 cm.

[Measurement of Compressive Strength After Impact (CAI)]

The iron weight was dropped at the center of a rectangular test plate 4 inches in width and 6 inches in length under the above condition 2, and further, the CAI was measured in accordance with the SACMA recommended measuring method (SRM2).

Reference Example

As a reinforcement fiber fabric, a fabric of 145 g/m² (weight per square meter) made of carbon fiber "MR50K4.5M" (trade name; manufactured by Mitsubishi Rayon Co., Ltd.) weaved by 5-harness satin weave, was used. The reinforcement fiber fabrics were laminated with a structure of lamination of [(0/90)/(±45)]8S in a mold, the mold was closed, a modified epoxy resin "#985" (trade name; manufactured by Mitsubishi Rayon Co., Ltd.) was injected under pressure at 95° C. into the mold through a gate (port) provided at the side of the mold, and the modified epoxy resin #985 was hardened at 180° C. for two hours. A molded material was taken from the mold and flashings were removed to obtain a test plate for evaluation.

The test plate was subjected to the above impact test, the area of damage was determined using the ultrasonic scanner, the area was determined to be 100 as a reference, and damaged areas of the following examples and the above reference were compared by subjecting to impact under the same conditions respectively to exhibit their relative value.

Example 1

As a thermoplastic resin for reinforcing spaces between the layers, a plain fabric of 10 g/m² (count of each of weft and warp: 12 threads per inch), which was formed of long fibers composed of 2.64 d/36 filament of nylon 12, was prepared. The reinforcement fiber fabric which was the same as used in the reference example and the above fiber fabric composed of the thermoplastic resin for interlaminar reinforcement were alternately laminated in the mold to form a lamination, wherein both outermost layers of the lamination were formed of the reinforcement fiber fabrics. Except for these processes, a composite material was prepared by the same processes as described in the Reference Example. The obtained composite material was evaluated by the test for interlaminar debonding. As a result, the damaged area decreased to 73% when carrying out the test under the condition 1 and 68% when carrying out the test under the condition 2.

When the cross-section of the obtained composite material was observed, it was found that the composite material was molded without voids; thus, the liquid resin was confirmed to be able to flow in the preform without being disturbed by the fiber fabric composed of the thermoplastic resin for reinforcing spaces between the layers.

Example 2

As a thermoplastic resin for reinforcing spaces between the layers, a uniaxial fabric of 10 g/m² (count of warp: 23 threads per inch; count of weft: a pair of cord fabrics per two inches), which was woven by the same nylon 12 as used in Example 1, was prepared. Except for the above process, a composite material was prepared by the same process as described in Example 1. The obtained composite material was evaluated by the test for interlaminar debonding. As a result, the damaged area decreased to 70% when carrying out the test under the condition 1 and decreased to 65% when carrying out the test under the condition 2.

When the cross-section of the obtained composite material was observed, it was found that the composite material was molded without voids; thus, the liquid resin was confirmed to be able to flow in the preform without being disturbed by the fiber fabric composed of the thermoplastic resin for reinforcing spaces between the layers.

Example 3

As a thermoplastic resin for reinforcing spaces between the layers, a non-woven fabric was used, wherein the non-woven fabric was obtained as follows: the same nylon 12 fiber as used in Example 1 was chopped into 10 mm lengths, the chopped fiber was dispersed in water; the dispersed fibers were collected on a screen to an areal weight of 10 g/m²; and the collected fibers were heat-pressed. Except for the above processes, a composite material was prepared by the same process as described in Example 1. The obtained composite material was evaluated by the test for interlaminar debonding. As a result, the damaged area decreased to 69% when carrying out the test under the condition 1 and decreased to 66% when carrying out the test under the condition 2.

When the cross-section of the obtained composite material was observed, it was found that the composite material was molded without voids; thus, the liquid resin was confirmed to be able to flow in the preform without being disturbed by the non-woven fabric composed of the thermoplastic resin for reinforcing spaces between the layers.

Example 4

As a thermoplastic resin for reinforcing spaces between the layers, the same nylon 12 fiber as used in Example 1 chopped into 10 mm lengths was used. The chopped fiber was dispersed on the same reinforcement fiber fabric formed of carbon fiber as used in Reference Example, so as to be 10 g/m², the other reinforcement fiber fabric was laminated on this reinforcement fiber fabric, and this series of processes was repeated. Except for the above processes, a composite material was prepared by the same process as described in Example 1. The obtained composite material was evaluated by the test for interlaminar debonding. As a result, the damaged area decreased to 72% when carrying out the test under the condition 1 and decreased to 68% when carrying out the test under the condition 2.

When the cross-section of the obtained composite material was observed, it was found that the composite material was molded without voids; thus, the liquid resin was confirmed to be able to flow in the preform without being disturbed by the chopped fiber composed of the thermoplastic resin for reinforcing spaces between the layers.

Example 5

As a thermoplastic resin for reinforcing spaces between the layers, a network structure of the same nylon 12 fiber as used in Example 1 was prepared. The network structure was prepared by providing the nylon 12 fiber on a silicone rubber sheet in one direction so as to be 5 g/m² or at intervals of 2.1 mm, providing another nylon 12 fiber on the provided nylon 12 fiber in the perpendicular direction so as to be at the same pitch as the above, and heat-pressing the lamination. Except for the above processes, a composite material was prepared by the same process as described in Example 1. The obtained composite material was evaluated by the test for interlaminar debonding. As a result, the damaged area decreased to 66% when carrying out the test under the condition 1 and decreased to 63% when carrying out the test under the condition 2.

When the cross-section of the obtained composite material was observed, it was found that the composite material was molded without voids; thus, the liquid resin was confined to be able to flow in the preform without being disturbed by the network structure composed of the thermoplastic resin for reinforcing spaces between the layers.

Example 6

As a thermoplastic resin for the interlaminar reinforcement, a porous film of 10 g/m$^2$, which was obtained by making holes 3 mm in diameter at intervals in a lattice of 5 mm squares on a nylon 12 film of 13.9 g/m$^2$, was prepared. Except that the above film was used, a composite material was prepared by the same process as described in Example 1. The obtained composite material was evaluated by the test for interlaminar debonding. As a result, the damaged area decreased to 65% when carrying out the test under the condition 1 and decreased to 61% when carrying out the test under the condition 2.

When the cross-section of the obtained composite material was observed, it was found that the composite material was molded without voids; thus, the liquid resin was confirmed to be able to flow in the preform without being disturbed by the porous film composed of the thermoplastic resin for reinforcing spaces between the layers.

Each form and amount of use of the thermoplastic resins for reinforcing spaces between the layers used in each example, and the results of interlaminar debonding tests, are shown in Table 1.

TABLE 1

| | Form of thermoplastic resin | Weight per square meter of thermoplastic resin layer (g/m$^2$) | Damaged area (relative value) Condition 1 | Damaged area (relative value) Condition 2 |
|---|---|---|---|---|
| Reference Example | none | 0 | 100 | 100 |
| Example 1 | plain fabric | 10 | 73 | 68 |
| Example 2 | uniaxial fabric | 10 | 70 | 65 |
| Example 3 | non-woven fabric | 10 | 69 | 66 |
| Example 4 | chopped fiber | 10 | 72 | 68 |
| Example 5 | reticulated structure | 10 | 66 | 63 |
| Example 6 | porous film | 10 | 65 | 61 |

Comparative Example 1

The same fabric as was used in the Reference Example was used as a reinforcement fiber fabric and a modified bismaleimide resin "#2010" (trade name; manufactured by Mitsubishi Rayon Co., Ltd.) was used as a matrix resin. A composite material was prepared by the steps of: providing unreacted modified bismaleimide resin flatly in a lower mold composed of a bottom plate and an outer frame having an outlet at its side; providing a preform formed by laminating the reinforcement fiber fabric on the unreacted modified bismaleimide resin; providing an upper mold which is a small slidable lid on the preform; exhausting air contained in the preform through the outlet provided at the side of the mold; heating the preform to 100° C. in a vacuum so as to impregnate it with a liquid resin (unreacted modified bismaleimide resin) in the direction of thickness of the preform; heating the mold to 180° C. for six hours to harden the liquid resin; and removing the composite material from the mold. Subsequently, the composite material was heated in a forced convection oven at 232° C. for six hours to carry out post-curing in order to obtain a test plate for evaluation.

The test plate was subjected to an impact under Condition 2 to determine the area of damage, and the damaged area was compared with that of each Example.

Example 7

As a thermoplastic resin for the interlaminar reinforcement, a plain-woven fabric having 10 g/m$^2$ (count of each weft and warp: 6 threads per inch) was prepared, wherein the plain-woven fabric was formed by weaving tow of bound 48 fibers of 3.96 d made of polyimide resin "MATRIMID 5218" (trade name; manufactured by Ciba-Geigy).

The reinforcement fiber fabric and the above thermoplastic resin fabric for the interlaminar reinforcement were laminated alternately on the unreacted resin in the mold to be a laminated material, the laminated material in which the upper and lower outermost surfaces were made of the reinforcement fiber fabric, was molded and post-cured using the same process as Comparative Example 1 to obtain a test plate for evaluation.

The test plate was subjected to an impact under Condition 2 to determine the area of damage, and the damaged area was decreased to 83% in comparison with Comparative Example 1.

Example 8

As a thermoplastic resin fabric for the interlaminar reinforcement, a plain-woven fabric having 20 g/m$^2$ (count of each weft and warp: 12 threads per inch), formed by weaving the same fiber as used in Example 7, was prepared. Except that the above plain-woven fabric was used, a test plate for evaluation was prepared by the same process as described in Example 7.

The test plate was subjected to an impact under Condition 2 to determine the area of damage, and the damaged area was decreased to 60% in comparison with Comparative Example 1.

Example 9

As a thermoplastic resin fabric for the interlaminar reinforcement, a plain-woven fabric having 30 g/m$^2$ (count of each weft and warp: 18 threads per inch), formed by weaving the same fiber as used in Example 7, was prepared. Except that the above plain-woven fabric was used, a test plate for evaluation was prepared by the same process as described in Example 7.

The test plate was subjected to an impact under Condition 2 to determine the area of damage, and the damaged area was decreased to 41% in comparison with Comparative Example 1.

Each amount for use of the thermoplastic resin fabric for the interlaminar reinforcement used in Comparative Example 1 and Examples 7 to 9, and the damaged areas obtained by adding each an impact under Condition 2, are shown in Table 2.

TABLE 2

|  | Example 7 | Example 8 | Example 9 | Comparative Example 1 |
|---|---|---|---|---|
| Weight per square meter of thermoplastic resin fiber fabric (g/m²) | 10 | 20 | 30 | 0 |
| Damaged area under Condition 2 (relative value) | 83 | 60 | 41 | 100 |

Comparative Example 2

As a reinforcement fiber fabric, a fabric of 145 g/m² (weight per square meter) made of a carbon fiber "TR50S12M" (trade name; manufactured by Mitsubishi Rayon Co., Ltd.) woven by uniaxial fabric, was used. The reinforcement fiber fabrics were laminated with a structure of lamination of [45/0/-45/90]4S in the mold. Except for the above process, the same molding as in the Reference Example was carried out to obtain a composite material.

Compressive strength after impact (CAI) which was measured after the composite material was subjected to damage by the impact test under Condition 2, was 188 MPa.

Comparative Example 3

The reinforcement fiber fabric which was the same as that used in Comparative Example 2, was laminated with a structure of lamination of [45/0/-45/90]4S in the mold. The laminated material was stitched with thread formed of carbon fiber "TR50S12M" (trade name; manufactured by Mitsubishi Rayon Co., Ltd.) with single stitching at 5 mm stitch (a pitch of 10 mm) and 5 mm intervals between rows of single stitches and the stitched laminated material was provided in the mold. Except for the above process, the same molding process as in the Reference Example was carried out to obtain a composite material.

The area damaged by the impact test under Condition 2 was decreased to 35% in comparison with Comparative Example 2; however, the CAI was 217 MPa.

Example 10

As a thermoplastic resin fabric for the interlaminar reinforcement, the same fabric as was used in Example 1 was used. The reinforcement fiber fabric used in the Comparative Example and the thermoplastic resin fabric for reinforcing between layers were laminated alternately in the mold to form a laminated material in which the upper and lower outermost surfaces were made of the reinforcement fiber fabric. Except for the above process, a test plate for evaluation was prepared by the same process as described in Comparative Example 2.

The area damaged by the impact test under Condition 2 was decreased to 63% in comparison with Comparative Example 2, and the CAI was 255 MPa.

The evaluation results of Comparative Examples 2 and 3, and Example 10 are shown in Table 3.

Example 11

A sized yarn, which was prepared by impregnating 0.01 g/m of the resin used in the Reference Example in the nylon filaments used in Example 1 and the reinforcement fiber in directions perpendicular to each other, were laminated at both surfaces of the reinforcement fiber fabric which was the same as was used in Comparative Example 2 at a pitch of 12 threads per inch to prepare a sheet. The sheet was laminated with a structure of lamination of [45/0/-45/90]4S in the mold. Except for the above process, the same molding process as in Comparative Example 2 was carried out to obtain a test plate for evaluation.

The area damaged by the impact test under Condition 2 was decreased to 60% in comparison with Comparative Example 2, and the CAI was 258 MPa.

Example 12

A uniaxial fabric of carbon fiber with carbon fiber at 145 g/m² and nylon filament at 10 g/m² was prepared by carrying out plain-weaving of the reinforcement fiber, which was the same used in Comparative Example 2, as warp and the nylon filaments, which were the same nylon filaments used in Example 1 was used as weft (count 24 threads per inch). The uniaxial fabric of carbon fiber was laminated with [45/0/-45/90]4S in the mold. Except for the above process, a test plate for evaluation was prepared by the same process as described in Comparative Example 2.

The area damaged by the impact test under Condition 2 was decreased to 62% in comparison with Comparative Example 2, and the CAI was 256 MPa.

The evaluation results of Comparative Examples 2 and 3, and Examples 10, 11, and 12 are shown in Table 3.

TABLE 3

|  | Ex. 10 | Ex. 11 | Ex. 12 | Comparative Ex. 2 | Comparative Ex. 3 |
|---|---|---|---|---|---|
| Damaged area under Condition 2 (relative value) | 63 | 60 | 62 | 100 | 35 |
| CAI (MPa) | 255 | 258 | 256 | 100 | 217 |

INDUSTRIAL APPLICABILITY

The preform of the present invention can be molded by resin transfer molding to provide a composite material comprising excellent strength and interlaminar debonding resistance.

What is claimed is:

1. A preform for a composite material, comprising at least two layers of a reinforcing material comprising a reinforcement fiber and, between the layers, a thermoplastic resin layer having spaces to allow liquid resin to flow through the preform, wherein the layers of the preform are laminated, and wherein the thermoplastic resin layer has a weight per square meter of 1 to 50 g/m².

2. The preform according to claim 1, wherein the thermoplastic resin layer comprises a thermoplastic resin fiber thread.

3. A preform for a composite material, comprising at least two layers of a reinforcing material comprising a reinforcement fiber, wherein a plurality of thermoplastic resin threads are adhered or woven approximately parallel to each other on a surface of the reinforcing material, and wherein the thermoplastic resin threads are present in a weight per square meter of 1 to 50 g/m².

4. The preform according to claim 1, wherein the reinforcing material is a woven fabric.

5. The preform according to claim 1, wherein the thermoplastic resin is at least one selected from the group consisting of polyamides and polyimides.

6. A fiber-reinforced composite material formed by molding the preform according to claim 1.

7. The preform according to claim 2, wherein the layer which is made of thermoplastic resin and has space so that flow of liquid resin to be injected for molding composite material is uninhibited, has a weight per square meter of 1 to 50 g/m².

8. The preform according to claim 3, wherein the reinforcing material is a woven fabric.

9. The preform according to claim 3, wherein the thermoplastic resin is at least one selected from the group consisting of polyamides and polyimides.

10. A fiber-reinforced composite material formed by molding the preform according to claim 3.

11. A fiber-reinforced composite material comprising the preform according to claim 1 and a cured resin, wherein the cured resin is present in each layer.

12. A fiber-reinforced composite material comprising the preform according to claim 3 and a cured resin, wherein the cured resin is present in each layer.

13. The fiber-reinforced composite material according to claim 11, wherein the cured resin is an epoxy.

14. The fiber-reinforced composite material according to claim 12, wherein the cured resin is an epoxy.

15. The preform according to claim 1, wherein the thermoplastic resin layer is nylon 12.

16. The preform according to claim 3, wherein the thermoplastic resin threads are nylon 12.

17. The preform according to claim 1, wherein the reinforcement fiber is a carbon fiber.

18. The preform according to claim 3, wherein the reinforcement fiber is a carbon fiber.

19. The preform according to claim 1, wherein the thermoplastic resin layer is a uniaxial, biaxial or triaxial plane woven fabric.

20. The preform for a composite material comprising at least two layers of a reinforcing material comprising a reinforcement fiber and, between the layers, a thermoplastic resin layer having spaces to allow liquid resin to flow through the preform, wherein the layers of the preform are laminated, and wherein the thermoplastic resin layer is a porous film.

* * * * *